United States Patent [19]

Wilkins et al.

[11] Patent Number: 4,770,782
[45] Date of Patent: Sep. 13, 1988

[54] METHOD FOR PREVENTING GEL/EMULSION FORMATION

[75] Inventors: Joyce M. Wilkins; David E. Breslin, both of Baton Rouge, La.

[73] Assignee: Exxon Chemical Patents Inc., Linden, N.J.

[21] Appl. No.: 65,084

[22] Filed: Jun. 19, 1987

Related U.S. Application Data

[63] Continuation of Ser. No. 704,673, Feb. 22, 1985, abandoned.

[51] Int. Cl.$^4$ ............................................. B01D 11/04
[52] U.S. Cl. ...................................... 210/638; 210/708
[58] Field of Search ............... 210/634, 638, 698, 708; 526/114, 115, 119, 326; 528/482

[56] References Cited

U.S. PATENT DOCUMENTS 4,016,349  4/1977  McKenna .......................... 528/482
4,382,852  5/1983  McCoy et al. .................. 210/708 X
4,472,284  9/1984  Bolhofner ............................ 210/708

OTHER PUBLICATIONS

Treybal, Liquid Extraction, 1963, pp. 437–440 and 452–457 relied on.

*Primary Examiner*—Frank Spear
*Attorney, Agent, or Firm*—J. F. Hunt

[57] ABSTRACT

Elimination of gel/emulsion formation such as occurs during liquid-liquid extractions of elastomeric olefin polymers is accomplished by the introduction of a cationic polyelectrolyte into the extraction system. The removal of catalyst residues from a solution of elastomeric olefin polymers by means of aqueous extraction, which can be accompanied by gel/emulsion formation, is facilitated by the presence of a cationic polyelectrolyte such as melamine-formaldehyde resin cationic colloids whereby a useful polymer product is obtained.

7 Claims, No Drawings

METHOD FOR PREVENTING GEL/EMULSION FORMATION

This is a continuation of application Ser. No. 704,673, filed 2/22/85, now abandoned.

FIELD OF THE INVENTION

The present invention relates to a method for prevention gel/emulsion formation and more particularly to a liquid extraction process used for purifying elastomeric olefin polymers or copolymers produced in liquid phase.

BACKGROUND OF THE INVENTION

Liquid-liquid extraction, also referred to as solvent extraction, processes are widely used to purify products in which the product contaminants are preferentially soluble in one of the liquid phases and the desired product is preferentially soluble in the other phase which is immiscible with the first liquid phase. The commercial extractors employing solvent extraction include both unagitated and agitated columns such as mixer-settlers all of which rely on the transfer of the component to be separated (the consolute component) from one liquid phase through the interface with the other (second) liquid phase and into the second phase. It is common for gelation and or emulsification between the first and second liquid phases to develop when so influenced by the consolute component.

Illustrative of industrial applications of solvent extraction are separation of aromatic and aliphatic hydrocarbons, desulfurization of hydrocarbons, butadiene separation, caprolactam extraction, manufacture of acetic acid, pharmaceutical processes such as for antibiotics and vitamins, phenol production, manufacture of synthetic elastomers and inorganic metal extraction applications such as is used in conversion of ilmenite to titanium dioxide. Oftentimes these extraction processes utilized a hydrocarbon such as hexane as one liquid component and water as the other liquid component relying on the solubility of the consolute component in water for its removal from and resultant purification of the desired product which is soluble in the hexane.

Such a liquid-liquid extraction procedure is commonly used in the production of saturated or unsaturated, amorphous, elastomeric olefin copolymers. These include copolymers of ethylene with propylene, and terpolymers of ethylene with propylene and with a cyclic or acyclic nonconjugated diolefin, such as 1,5-cyclooctadiene, 1,4-hexadiene, 6-methyltetrahydroindene, methylene-norbornene, ethylidene-norbornene, etc. These copolymers and terpolymers are usually produced by solution processes, in the presence of catalytic systems consisting of compounds of the transition metals of Group V of the Periodic Table of Elements, preferably vanadium compounds, such as vanadium triacetylacetonate, vanadium oxychloride, and of organometallic compounds of metals of Groups I to III of the Periodic Table of Elements, preferably aluminum compounds.

When the process provides the polymers of appropriate molecular weight, it is useful to quench the polymerization by introducing a quenching agent such as water.

In such processes, it is necessary to purify the polymeric compounds by removing the catalyst residues therefrom because, besides contributing to the formation of ash content in the polymeric product, the presence in the polymer of these residues promotes the occurrence of oxidative degradation processes with consequent loss of quality of the polymeric product.

It is known from the prior art to purify elastomeric products in solution in suitable organic solvents, by a solvent extraction process involving washing the polymer solutions with aqueous solutions of suitable extracting agents which are capable of forming water soluble compounds with the catalyst residues and subsequently separating the aqueous phase from the organic phase. Unfortunately, quenching with water and/or washing with aqueous solutions of extracting agents, complexing agents, pH of the system, viscosity of one or both phases and the efficacy of mixing can result in emulsification and/or gelation of one or more of the components and/or poor contact between the extracting agent and the catalyst residues being extracted.

Various specific approaches to removing catalyst residue from the polymers are hereafter set forth: U.S. Pat. No. 3,337,514, to Knabeachuh et al, requires contacting a solution of an alpha-olefin copolymer with steam, then with aqueous mineral acid, then with water under turbulent conditions, and separating the copolymer solution from the aqueous phases; U.S. Pat. No. 3,740,381 approaches purification by washing with an aqueous solution of extracting agent in the presence of a propylene monomer and a solvent for the polymer product; U.S. Pat. No. 3,804,815 treats the polymer product with aqueous caustic, followed by filtration and removal of the aqueous phase; and, U.S. Pat. No. 4,016,349 utilizes polar liquid extractants (such as water) supported on a finely divided, solid material such as diatomaceous silica, silica gel, alumina or molecular sieves which material is then separated from the polymer solution.

There is also a need to prevent gel/emulsion formation in liquid-liquid extraction processes, particularly those in which water is one of the immiscible phases, and a need for a simple and efficient process for removing metal catalyst residues from alpha-olefin hydrocarbon polymer solutions, and especially a process suitable for continuous catalyst residue removal.

SUMMARY OF THE INVENTION

The needs as set forth above have been met in accordance with this invention by a method for preventing gel/emulsion formation in a liquid-liquid extraction process comprising the step of conducting said liquid-liquid extraction in the presence of at least a gel/emulsion inhibiting amount of a cationic polyelectrolyte.

Further, in accordance with this invention, there is provided a method for removing catalyst residue from an olefin polymer, generally from a solution of said polymer, by the step of introducing at least a gel/emulsion inhibiting amount [which generally is in the range of 1 to 20, preferably 3 to 8, optimally 4 to 6, weight parts per million(wppm)] of cationic polyelectrolyte to a mixture of a polymer solution containing catalyst residue and water (said wppm being based on the total weight of the water).

The cationic polyelectrolyte as used herein refers to a macromolecular polymer which contains polycations. The cationic polyelectrolytes are preferably dispersible and have molecular weights ($\overline{M}w$) ranging from 1,000 to 500,000 and preferably from 1,000 to 20,000. The preferred cationic polyelectrolytes are the cationic melamine-formaldehyde resins generally available as a colloidal dispersion and the alkylamine halohydrin copolymers.

According to this invention, it has been discovered that catalyst residues can be removed with high efficiency from a solution in an organic solvent of an alpha-olefin homopolymer or copolymer with one or more hydrocarbon monomers by contacting said solution at a temperature of about room temperature to about 140° C. with water and at least a gel/emulsion inhibiting amount such as about 2 parts per million of a water-dispersible cationic polyelectrolyte.

DETAILED DESCRIPTION OF THE INVENTION

As earlier discussed, liquid-liquid extractions are widely used throughout the chemical industry. For the best understanding of the process of the invention which has general application to liquid-liquid extractions, it has been concluded that it should be described in its utilization in the preparation and recovery of $\alpha$-olefin homopolymers and copolymers.

Any alpha-olefin homopolymers and copolymers with hydrocarbon monomers prepared in the presence of catalysts in solution in an inert solvent can be purified by the process of the present invention. These include, for example, polyethylene, polypropylene, polyisobutylene, polychloroisobutylene and ethylene/propylene/monoreactive nonconjugated diene copolymers (EPDM rubbers) in which the diene monomer can be among others 1,4-hexadiene, 5-ethylidene-2-norbornene, 5-(1-propenyl)-2-norbornene, 5-(2-butenyl)-2-norbornene, 2-ethyl-2,5-norbornadiene, and dicyclopentadiene. In addition to conventional EPDM rubbers, which are usually terpolymers, tetrapolymers of ethylene, propylene, a nonconjugated monoreactive diene, and a small amount of a nonconjugated direactive diene also are within the scope of the term "$\alpha$-olefin copolymer". Such polymers may be thought of as a special class of EPDM rubbers. They are specifically described in U.S. Pat. No. 3,819,591 to Campbell and Thurn. The preferred copolymer of this class is an ethylene/propylene/1,4-hexadiene/norbornadiene copolymer. Furthermore, tetrapolymers of ethylene, propylene, and two nonconjugated monoreactive dienes are included within the term "$\alpha$-olefin copolymer". These are considered to be conventional EPDM rubbers, although less commonplace than terpolymers. Such polymers are described in U.S. Pat. Nos. 3,651,932 to Cameli and 3,543,988 to Emde et al. A typical such polymer would be, for example, an ethylene/propylene/1,4-hexadiene/5-ethylidene2-norbornene copolymer. This invention is especially suitable for the purification of EPDM rubbers or other polymers before they are recovered from their solutions by phase decantation and evaporation of the solvent or by steam vaporization.

Any solvents conventionally used in polymerizations with Ziegler catalysts are suitable here. Preferably, they boil below about 150° C.

Preferred inert solvents are saturated hydrocarbons. These include alkanes, cycloalkanes, and alkylcycloalkanes. Typical solvents includes, for example, hexane, isooctane, cyclohexane, cycloheptane, methylcyclohexane, and other hydrocarbons of those classes. These and similar hydrocarbons are well known to those skilled in the art and are commercially available. They can be linear, branched, cyclic substituted with one alkyl group or with two or more alkyl groups, or unsubstituted cyclic. Since the solution must be liquid at the operating temperatures and pressure, the boiling and melting temperatures of the solvents will be chosen accordingly.

The polymer solution usually contains about 5-15% of polymer. The solvent oftent is hexane. It is necessary to have sufficient fluidity of the solution for contacting the solution with the extracting liquid to allow a good, controlled flow through the equipment used.

The vanadium and other transition metal catalyst residues present in the solution are derived from a coordination catalyst. Polymerization of olefins in the presence of Ziegler catalysts is well known. The vanadium catalysts are made by combining a vanadium compound with one or more organometallic, usually organoaluminum and/or organotitanium, compound(s). The vanadium component can be, for example, vanadium tetrachloride, vanadium trichloride, vanadium oxytrichloride, isopropyl vanadate, etc. Representative aluminum compounds include alkyl aluminum chlorides, dichlorides and sesquichlorides such as diethylaluminum chloride, diisobutylaluminum dichloride, triethylaluminum, triisobutylaluminum, ethylaluminum sesquichloride and diphenylaluminum chloride, etc. Representative organo titanium compounds from use of titanium-based catalysts include the tetraalkyl titanates represented by tetraisopropyl titanate, tetra-n-butyl titanate and tetrakis (w-ethylhexyl) titanate, etc. and organo titanate chelates represented by acetyl acetonate titanate chelate, ethyl acetoacetate titanate chelate, triethanolamine titanate chelate and lactic acid titanate chelate.

The quenching of the polymerization phase is carried out in a known manner using any polar liquid although water is preferred. Similarly, water is preferred for the liquid-liquid extraction of the vanadium and other metallic catalyst residues.

The useful cationic polyelectrolytes are polycationic macromolecular polymers which have a ($\overline{M}w$) range of 1,000 to 500,000.

A preferred class of cationic polyelectrolytes are the melamine formaldehyde resin cationic colloids which are of the general polymer structure:

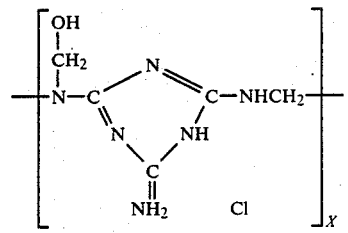

and of $\overline{M}w$ of from 1,000 to 20,000, preferably 5,000 to 10,000. Melamine-formaldehyde resin cationic colloids are well known as seen from the descriptions of U.S. Pat. Nos. 2,986,489 and 4,009,706 and readily realized by reacting 2 to 3 moles of formaldehyde with one mole of melamine and thereafter adding from 0.5 to 3.5 moles of an acid, e.g., HCl, per mole of melamine to produce a 6-20% aqueous colloidal resin system. Commercial examples are Jayfloc ® 820 and 824 sold by Exxon Chemical Americas of Houston, Tx., each of which contain 6 to 10% of resin colloids.

A further class of cationic polyelectrolytes found to exhibit titanate gel inhibition are the alkylamine halohydrin copolymers represented by dimethylamine epichlorohydrin copolymers, methylamine epichlorohydrin copolymers, dimethylamine ammonia epichlorohydrin copolymers, and dimethyl amine alkylene polyelectrolytes have ($\overline{M}w$)'s ranging from 50,000 to 500,000 (for a further discussion of such polyelectrolytes, see United Kingdom Patent Specification 1,408,111). A commercial example is Jayfloc ® 832 sold by Exxon Chemical Americas of Houston, Tx.

The polyelectrolytes is introduced by means of its addition into the water used to quench the polymerization although it could be introduced with the deashing water or introduced at a time in the continuous process whenever gel/emulsion formation develops at the interface of the polymer solution and the water since it appears effective both in inhibiting to preventing gel/emulsion formation and destructive of the gel/emulsion. The gel/emulsion appears to result from the presence of hydroxylated catalyst residue particularly that catalyst residue derived from the organotitanium compound usually a tetraalkyl titanate. This suggests that any process involving the production of a hydroxylated organo residue such as from the breakdown of an organotitanium compound as by hydrolysis can avoid gel/emulsion formation as a result the introduction of an aqueous component by the presence of a gel/emulsion inhibiting amount of a water-dispersible cationic polyelectrolyte, preferably where the pH of the system is between 4 and 9, optimally at about neutral. The liquid-liquid extraction can be conducted at from about 20° C. to 140° C., however, 60° C.–80° C. is preferred.

These organotitanium compounds which is processing may develop a gel at the interface of a two-phase aqueous system are used in a variety of processes beyond that described above including: preparation of adhesives; esters and transesterification reactions; condensation catalysis of phenol-formaldehyde resins, polymerization of lactones and molecular rearrangements; insolubilization of coating binders; crosslinking of elastomers; desulfurization of hydrocarbons; manufacture of polyesters; and polymerization of urethanes. The particular cationic polyelectrolyte used will of course vary with the degree of hydrophobicity and hydrophilicity of the immiscible solvents as will be apparent from the teachings herein as well as the consolute component provoking the gelation/emulsification.

This invention is illustrated by the following representative example of a preferred embodiment thereof, where all parts, proportions, and percentages are by weight unless otherwise indicated. The vanadium concentrations are given in parts per million parts of dry polymer (ppm).

EXAMPLE

The ethylene/propylene/5-ethylidene-2-norbornene terpolymer used in this example was prepared in a continuous reactor by polymerizing the monomers in hexane solution using a polymerization catalyst composed of $VOCl_3$, aluminum diethylchloride and tetrabutyl titanate. In the continuous polymerization process, the terpolymer-hexane polymerizate is quenched with water as it enters the settling drum where the catalyst residues are extracted by the addition of water in a liquid-liquid extraction step. The polymerizate contained about 14% polymer, catalyst residue, unreacted monomers and hexane as the solvent. After quenching, the polymerizate was admixed with about an equal volume of equal amounts of deashing water and hexane diluent. With the extraction conducted at a temperature of from 60° to 70° C. and about a neutral pH, a flocculant gel-like emulsion was developed at the hexane-water interface. Introduction of Jayfloc ® 820 containing about 8 wt. % of the melamine-formaldehyde resin cationic colloids with the quench water over a dosage range of 25 to 200 parts per million based on weight of the quench/deashing water prevented the appearance of any flocculant gel-like precipitate with no adverse effects on the settling rate or deashing efficiency of the liquid-liquid extraction which after settling and separation of the hexane solution yielded a cement of about 7% by weight of the terpolymer in hexane, said terpolymer having a Mooney viscosity of between 35° to 45° C. at 100° C.

What is claimed is:

1. A method for preventing gel/emulsion formation at the interface in a liquid-liquid extraction process comprising the step of conducting said liquid-liquid extraction in the presence of at least a gel/emulsion inhibiting amount of a cationic polyelectrolyte selected from melamine-formaldehyde resins and alkylamine halohydrin copolymers so as to prevent gel/emulsion formation at the interface and permit transfer of a component from one liquid phase through the interface into the second liquid phase.

2. A method for preventing gel/emulsion formation at the interface in a mixture of water and hydrocarbon solvent containing a titanate ester comprising the steps of introducing at least a gel/emulsion inhibiting amount of a cationic polyelectrolyte into said mixture, said cationic polyelectrolyte being selected from melamine-formaldehyde resins and alkylamine halohydrin copolymers so as to permit transfer of said titanate ester from said hydrocarbon solvent through the interface of the water.

3. A method for removing catalyst residue from a solution of an alpha-olefin polymer comprising the steps of introducing at least a gel inhibiting amount of a cationic polyelectrolyte into a mixture of a hydrocarbon solution of said polymer and water to prevent gel/emulsion formation at the interface of said solution and water and thereby permit removal of catalyst residue, and separating the water phase containing said residue from the alpha-olefin polymer solution, said cationic polyelectrolyte being selected from melamine-formaldehyde resins and alkylamine halohydrin copolymers.

4. A method for removing catalyst residue from a hydrocarbon solution of an olefin polymer by aqueous extraction comprising the steps of extracting the catalyst residues from a water-immiscible solution of alpha-olefin polymer with water in the presence of at least a gel/emulsion inhibiting amount of a water-dispersible cationic polyelectrolyte selected from melamine-formladehyde resins and alkylamine halohydrin copolymers to prevent gel/emulsion formation at the interface of said hydrocarbon solution and water, separating the water from the cement consisting of polymer solute and water-immiscible solvent, and recovering the polymer from said cement.

5. In a process for removing catalyst residues from elastomeric ethylene homopolymers and copolymers prepared in the presence of catalysts comprising transition metal compounds and organometallic compounds by washing the catalyst residues out of said homopolymers or copolymers, the improvement comprising performing the washing by means of an aqueous system in the presence of from 1 to 20 weight parts per million weight parts water (wppm) of a water-dispersible cationic polyelectrolyte of molecular weight (Mw) ranging from 1,000 to 500,000 so as to prevent gel/emulsion formation at interface of said homopolymers or copolymers and said aqueous system to permit transfer of said catalyst residues from said homopolymers or copolymers to said aqueous system, said cationic polyelectrolyte being selected from melamine-formaldehyde resins and alkylamine halohydrin copolymers.

6. The method according to claim 4 wherein said solvent is hexane and said polyelectrolyte is a melamine formaldehyde resin cationic colloid having a (Mw) ranging from 1,000 to 20,000 and present in an amount ranging from 1 to 2 weight parts per million (wppm) based on the weight of the water in the extraction.

7. The method according to claim 6 wherein said step of extracting is carried out at a temperature ranging from 60° C. to 70° C. and the pH ranges from 4 to 9.

* * * * *